United States Patent [19]
Meindl et al.

[11] 3,888,238
[45] June 10, 1975

[54] ULTRASONIC BLOOD VESSEL IMAGING SYSTEM AND METHOD

[75] Inventors: James D. Meindl, Los Altos; Charles F. Hottinger, Stanford, both of Calif.

[73] Assignee: Stanford University, Stanford, Calif.

[22] Filed: Sept. 28, 1973

[21] Appl. No.: 401,649

[52] U.S. Cl............... 128/2 V; 128/2.05 Z; 73/67.7
[51] Int. Cl............................................. A61b 10/00
[58] Field of Search............ 128/2 V, 2.05 Z, 24 A; 73/67.7, 67.8 R, 67.8 S; 310/9.6; 340/5 MP, 9

[56] References Cited
UNITED STATES PATENTS

| | | | |
|---|---|---|---|
| 3,577,772 | 5/1967 | Perihou.................. | 128/2 V |
| 3,756,071 | 9/1973 | Dory...................... | 73/67.8 |
| 3,777,740 | 12/1973 | Hokanson............... | 128/2.05 Z |
| 3,778,757 | 12/1973 | Houston................. | 73/67.7 |
| 3,789,350 | 1/1974 | Rolle..................... | 340/5 MP |
| 3,789,833 | 2/1974 | Bom....................... | 128/2 V |

*Primary Examiner*—Richard A. Gaudet
*Assistant Examiner*—Lee S. Cohen
*Attorney, Agent, or Firm*—Flehr, Hohbach, Test, Albritton & Herbert

[57] ABSTRACT

A transcutaneous system and method for real time imaging of blood vessels. The system includes a transducer having one or more arrays of transducer elements for scanning across or along blood vessels. Preferably, the transducer includes three arrays arranged in an H-shape configuration to scan two spaced cross-sections of the vessel and a lengthwise section of a vessel under examination. The transducer elements are sequentially connected to a pulsed Doppler flow detection system which detects blood flow at various depths under each element and forms a display of the location and depth of detected blood flow to indicate vessel location, cross-section and orientation.

8 Claims, 18 Drawing Figures

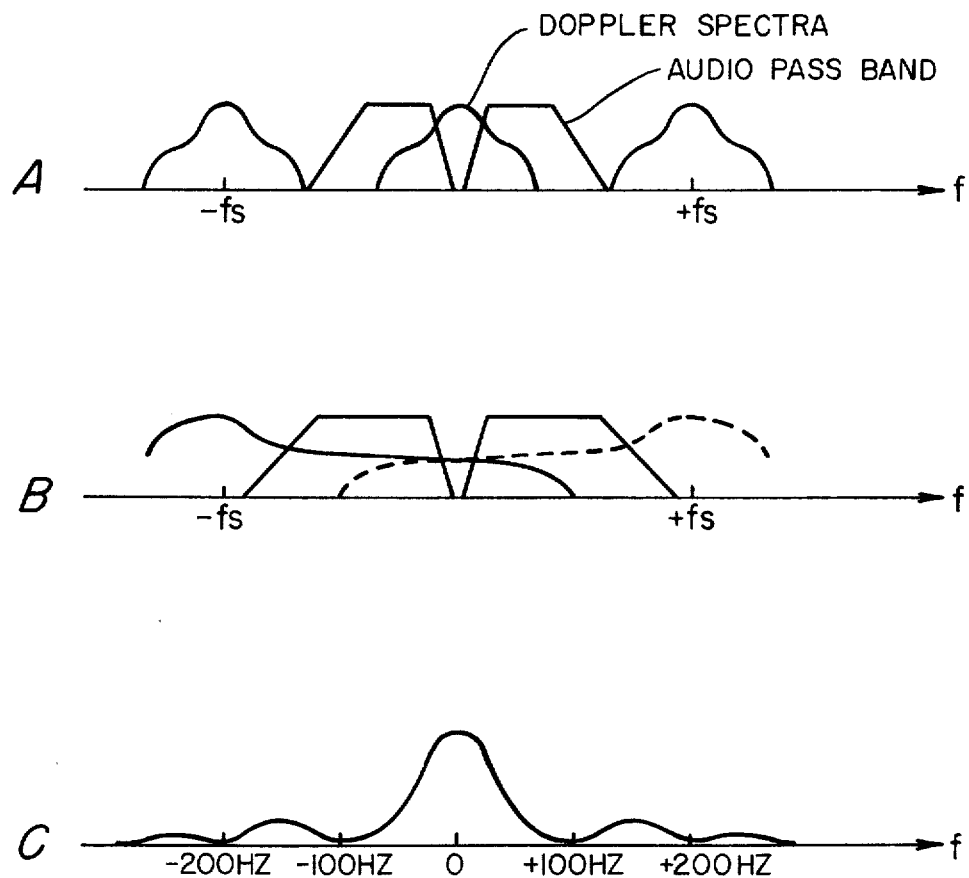
FIG. 10 (f = SAMPLING RATE)

ULTRASONIC BLOOD VESSEL IMAGING SYSTEM AND METHOD

GOVERNMENT CONTRACT

The invention described herein was made in the performance of work under a contract with the Department of Health, Education & Welfare, Contract No. 1 P01 GM17940-01.

BACKGROUND OF THE INVENTION

This invention relates generally to an ultrasonic blood vessel imaging system and method and more particularly to a transcutaneous system and method capable of providing real time images.

Visualization of blood vessels using ultrasonic Doppler techniques is known. However, the prior art equipment requires multiple manual scans with a single transducer to show a vessel. In one type of equipment the transducer is associated with a system which detects specular reflection of vessel walls to display the vessel. Specular reflections from the vessel walls are sensitive to transducer alignment. The blood tissue interface within diseased vessels may be difficult to locate using simple pulse-echo techniques. Another method has been to employ a single, manually manipulated transducer associated with a system which detects the flow of blood whereby to delineate the interior of the blood vessel and overcome the problems associated with specular reflection from the walls.

OBJECTS AND SUMMARY OF THE INVENTION

It is a general object of the present invention to provide an ultrasonic blood vessel imaging system and method which provides real time images of the blood vessels.

It is another object of the present invention to provide an ultrasonic blood vessel imaging system and method which employs an array of pulsed transducers in a pulsed Doppler system to provide real time images of blood vessels.

The foregoing and other objects of the invention are achieved by an ultrasonic blood vessel imaging system in which transducer elements forming an array are periodically and sequentially driven with pulse energy having a predetermined frequency. A Doppler receiver receives the reflected energy sequentially from each of said transducer elements and provides a video signal output. The receiver output is periodically sampled to provide an output when there is a reflection or scattering from a moving blood cell at a depth corresponding to the sampling position. The output is employed to form a display which is a real time image of the blood vessel portion underlying the transducer array.

BRIEF DESCRIPTION OF THE DRAWINGS

FIGS. 10A, 10B and 10C show the audio spectrum for different sampling conditions.

BRIEF DESCRIPTION OF PREFERRED EMBODIMENT

Figure 1:
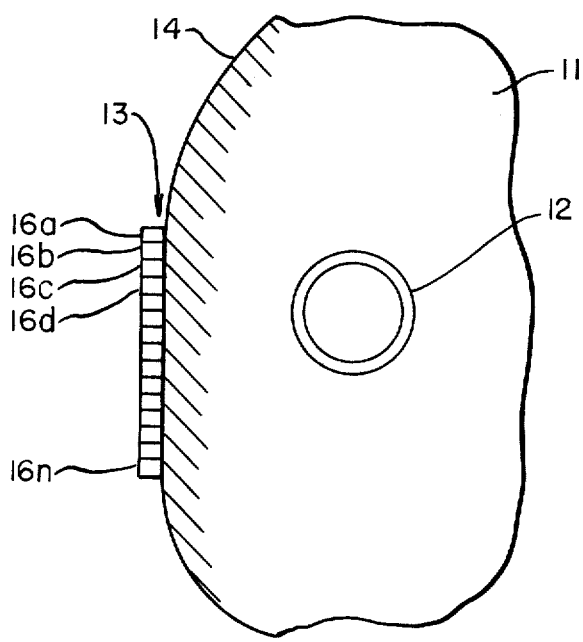
FIG. 1 shows a blood vessel disposed under the skin with a transducer array contacting the skin opposite the vessel.

Referring first to FIG. 1, there is shown a section of tissue 11 which surrounds a blood vessel 12 which may be an artery or vein and through which the blood flows. A transducer 13 is shown disposed on the surface of the skin 14 opposite the vessel 12. The transducer 13 includes a plurality of in line piezoelectric transducer elements 16 forming an array.

Figure 2:
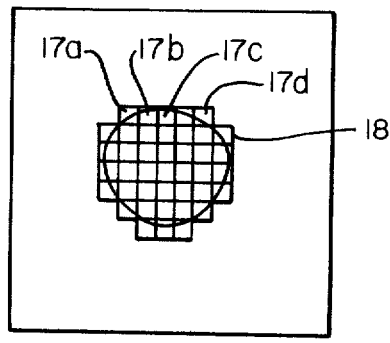
FIG. 2 shows the real time display achieved employing an array of the type shown in FIG. 1 in a Doppler system.

When the transducer elements are energized by pulses of electrical energy of predetermined frequency, they transmit sound waves through the underlying tissue. The sound waves are reflected or scattered by discontinuities in the medium through which they travel including the blood cells. A certain amount of the scattered energy is reflected back towards the transducers where it is converted to electrical signals. The transducer is associated with a Doppler detection system which detects reflections from moving cells to provide a signal. The signal is processed to provide a display such as shown in FIG. 2. Referring to the figure, it is noted that there is no display for transducer 16a since there are no underlying moving cells. However, for the transducer 16c, there is a display because of the Doppler shift provided by the moving blood cells within the vessel 12 reflect energy. The reflected energy for each energizing pulse arrives at the transducer at different times depending on the depth of the cells. The spots 17a, 17b, 17c and 17d show reflections from different depths. For the transducer 16d, there are a plurality of reflections indicated generally by the spots 18. Similarly, there are spots corresponding to the remaining elements. It will be apparent that by employing a larger number of transducer elements, better lateral resolution can be obtained.

Figure 3:
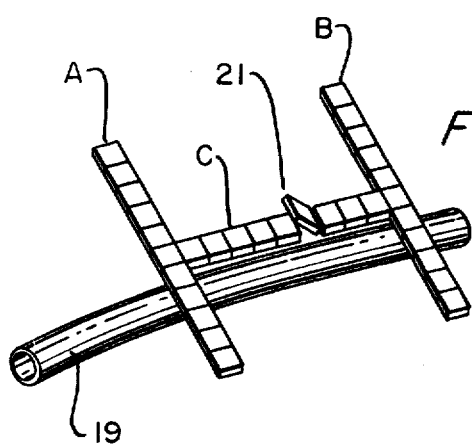
FIG. 3 shows three arrays arranged in an H-shape configuration adapted to provide an image of the vessel cross-section at spaced points along the vessel and of the intermediate length of the vessel.
Figure 4:
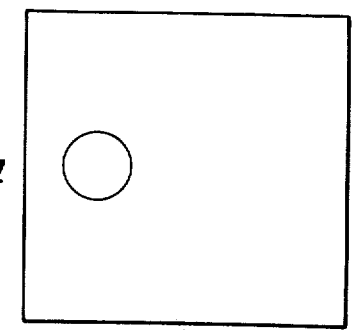
FIG. 4 shows the cross-section image obtained with one of the arrays of FIG. 3.
Figure 5:
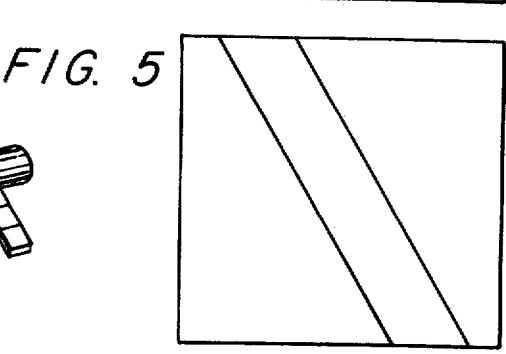
FIG. 5 shows the longitudinal image obtained with another array.
Figure 6:
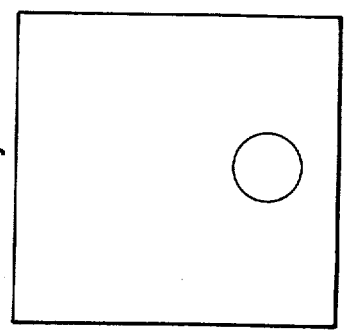
FIG. 6 shows the cross-section image obtained with the third array.

Referring to FIG. 3, there is shown a transducer which employs an H-shaped array including parallel arrays A and B, and the perpendicular array C. A blood vessel 19 is shown beneath the array. Referring to FIG. 4, the display achieved in accordance with the present invention for the array A is illustrated imaging the cross-section of the vessel at that location. Referring to FIG. 6, the cross-sectional image of the vessel lumen opposite the array B is shown. FIG. 5 shows the longitudinal image of a lengthwise section of the vessel between the arrays A and B. It is to be noted that with these three displays it is possible to obtain not only the location but also the orientation of the vessel.

To determine the orientation of the vessel axis, the images in FIGS. 4 and 6 are monitored while the H-shaped array is translated or moved. The array is rotated until the centers of the vessel lumens, imaged in FIGS. 4 and 6, are directly under the center elements of arrays A and B. When this has been achieved, the axis of the C array, between the centers of arrays A and B, is directly over the blood vessel axis. When the C array is thus positioned, the vessel image in the display, FIG. 5, can be examined to determine the depth of the vessel and the orientation of the vessel axis with respect to the axis of the C array. This relative orientation with respect to the known direction defined by the axis of array C indicates the orientation of the vessel axis. By having an indication of the depth and direction of the blood vessel, it is then possible to employ a conventional Doppler flow meter system employing a transducer 21 to measure blood flow within the vessel.

A typical display arrangement can, for example, be a cathode ray tube which is deflected in the X-direction in synchronism with the scanning of each element for reflections from various depths and in the Y-direction as one shifts from one element to the next adjacent element. The electron beam is intensity modulated in accordance with the signals received. That is, if a reflected signal received from a transducer for a particular depth indicates motion of blood cells, the beam is turned on thereby providing an illuminated spot.

Figure 7:
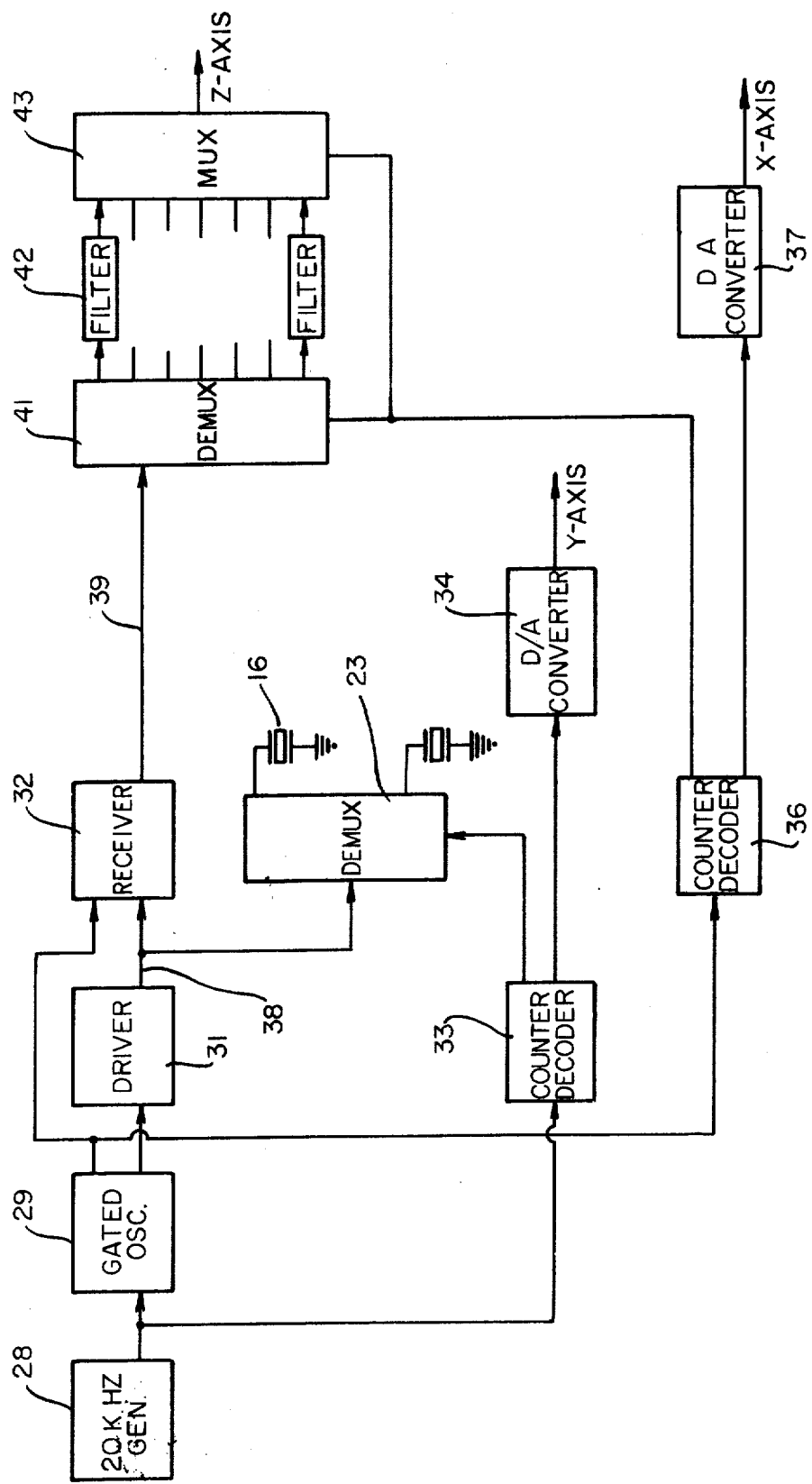
FIG. 7 is a block diagram of a Doppler system for operation with one of the arrays.

Referring more particularly to FIG. 7, the transducer elements 16 are shown connected to transducer demultiplexer 23. Each of the transducer elements 16 acts as a near field source and receiver in a Doppler system. For purposes of description, it is assumed that the transducer array includes eight transducer elements 16. It is understood that more elements can be used to provide improved lateral resolution. In operation, the elements are sequentially energized with a burst of energy having a predetermined frequency. By way of example, the burst may be a 1 microsecond burst at 6 MHz frequency. The signal reflected from the moving blood cells is received by the transducer and processed to detect Doppler frequency shift indicating moving blood cells at various depths underneath the transducer element. In one example, each element transmits in sequence 1 microsecond bursts at 50 microsecond intervals for a period of 10 milliseconds, or 200 bursts before sequencing to the next transducer element which emits 200 bursts. This permits detection of Doppler shifts down to 100 Hz. After each transducer has been fired in turn, the entire sequence repeats commencing with the first transducer. During the fifty microsecond interval between bursts, the associated trace on the cathode ray tube of an associated display apparatus scans across the face of the tube to form repetitive traces at one position. When the system steps to the next transducer, the trace moves one increment in the vertical direction to provide another set of scans across the face.

The system shown in FIG. 7 includes a 20 kHz generator 28 which provides timing for the system. The generator is connected to gated 6 MHz oscillator 29 to gate the oscillator at a 20 kHz rate, FIG. 8A, to provide an output burst every fifty microseconds, FIG. 8B. The oscillator 29 also provides a continuous output to Doppler receiver 32. The bursts are amplified by driver 31 and applied to the demultiplexer 23. The output from the 20 kHz generator is also applied to a counter decoder 33 which serves to count the output from the generator 28 and provides control signals to the transducer demultiplexer 23. For example, the counter decoder 33 may be a ring counter which provides control signals to the transducer demultiplexer so that after two hundred pulses have been applied to a transducer element, the bursts from driver 31 are applied to the next transducer element 16. The counter serves to sequentially shift through the elements 16 until they are all scanned, and then returns to the first element where the cycle repeats. The counter decoder also provides an output to a digital to analog converter 34 which is associated with the Y-axis deflection of the cathode ray tube whereby the cathode ray tube scan is deflected in the Y-direction to provide the next display line or row corresponding to the next transducer element.

The continuous output from the gated 6 MHz oscillator may also be employed to drive a decoder counter 36 which serves to count and decode the input signal and provide an output to a digital to analog converter 37 which controls the X-axis deflection of the cathode ray tube, that is, each time a transducer element is energized, the X-axis scan begins in synchronism therewith. It will be apparent that certain oscilloscopes are provided with internal X-axis deflection sweep controls and that the internal control may be adjusted to scan at the proper rate in synchronism with the energizing of the transducer element.

Figure 8:
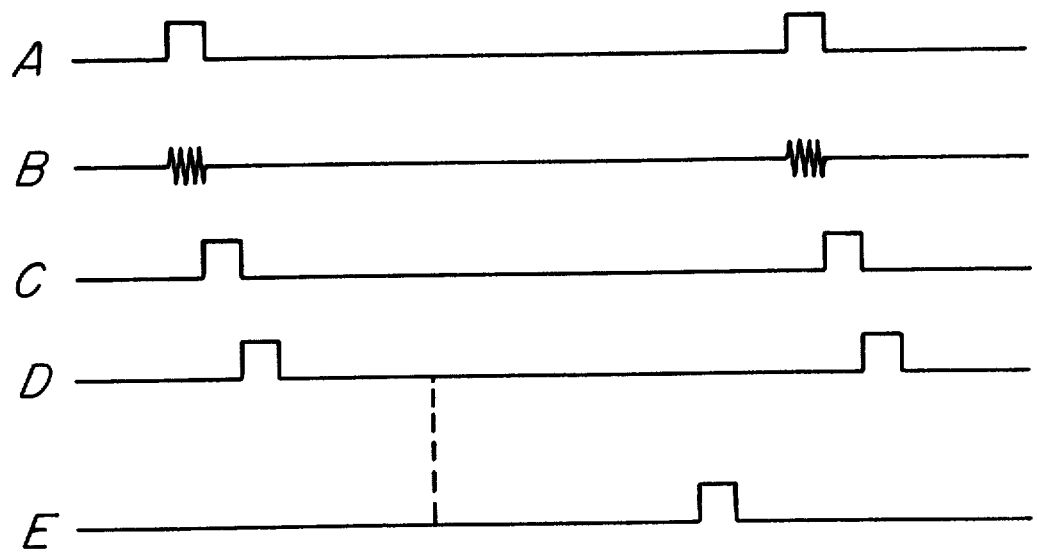
FIGS. 8A through 8E are timing diagrams showing energizing pulses and sampling pulses.
Figure 9:
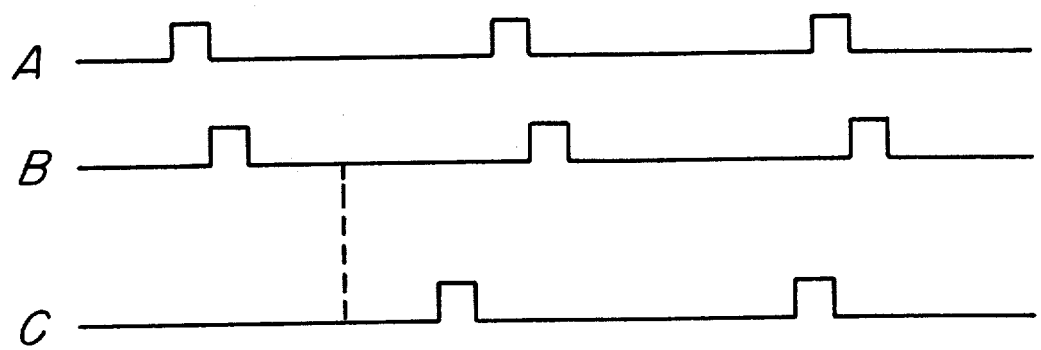
FIGS. 9A through 9C are timing diagrams for transducer element multiplexing.

At the time $t_0$, FIG. 8A, the first transducer element is energized from the driver 31 with a burst of energy such as shown in FIG. 8B. The reflected waveform strikes the transducer to generate an electrical signal which is directed along the line 38 to a Doppler receiver 32. The Doppler receiver is of a conventional type wherein the 6 MHz signal is multiplied with the reflected energy to provide a video output on the line 39 connected to the audio filter demultiplexer 41. In order to detect reflection from moving particles at various depths, the reflected energy must be sampled. The counter-decoder 36 connected to the oscillator 29 provides output control pulses such as shown in FIGS. 8C, D and E to control the demultiplexer 41 and the audio filter multiplexer 43. Preferably, the pulses are 1.3 microseconds wide. These pulses control the audio filter demultiplexer to sequentially connect the audio filters 42 to receive video signals for 1.3 microseconds. These pulses also control the audio filter multiplexer 43 so that the output of each filter is sequentially sampled to modulate the beam intensity or Z axis of the cathode ray tube. The time elapsed between the transmitted burst and the particular sampling window pulse determines the depth from which the reflected energy is being sampled. The first transducer element remains connected to the driver receiver for 10 milliseconds during which time the routine of burst generation by the transducer and video sampling by each filter is repeated two hundred times. After 10 milliseconds, the transducer cycling counter-decoder 33 disconnects the transducer element and connects the next element with the transducer receiver. The pattern of two hundred transmitted bursts each followed by video signalling is repeated. After all transducer elements have been successively connected and disconnected, the entire routine repeats commencing with the first transducer.

The following table outlines the sequence involved in operation of the apparatus:

TABLE I

⎡ 1. For each of eight transducer elements, beginning
⎢    with the first,
⎢       ⎡ A. Connect transducer element to driver,
80     ⎢ B. For 200 pulses,
m sec ⎢
⎢       ⎢    ⎡ 1. Transmit burst.

TABLE I-Continued

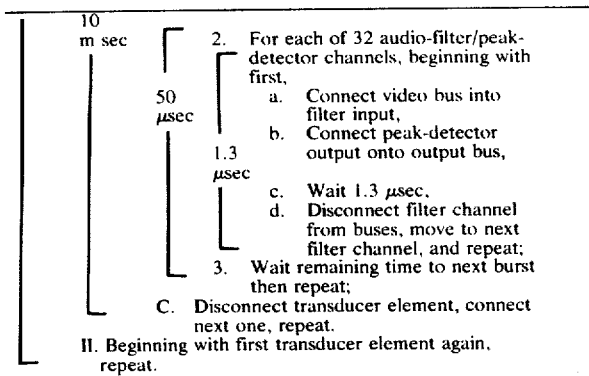

The 1.3 microsecond steps is the sampling window width during which an audio filter samples the video waveform. This window width corresponds to depth increments of 1 mm. A longer window width would result in a loss of axial resolution, while a window much shorter than 1.3 microseconds would not bring greater axial resolution due to the length of the transmitted burst. The 50 microseconds for steps 1, 2, 3 is the interval between transmit bursts generated at 20 kHz. For a carrier frequency of 6 MHz, no velocity below 125 cm per second could cause confusion of the Doppler spectra. However, there would be confusion in distance beyond 40 mm since reflection from this depth would be arriving just as the next signal emerged from the transducer. Depth confusion beomes less important assuming greater attenuation for longer paths if the sampling rate is decreased from 20 kHz. The nature of the overall system requires only one bit on-off information concerning Doppler shift occurring at a point. As shown in FIGS. 10A, 10B, so long as the new lower sampling rate is not within the pass band of the audio filters, the confusion of Doppler spectra will not be critical. Only a small part of the Doppler energy of any signal will likely ever be lost in a relatively narrow notch in the audio pass band. The 10 milliseconds for steps A–C determine the number of video signals taken from a point before moving to the next transducer element. As shown in FIG. 10C, if the audio pass band extends down to 100 Hz, then the video sample must be taken over at least a 10 millisecond period to avoid confusing d.c. energy with the bona fide 100 Hz Doppler shift. The 80 millisecond intervals for steps 1 and 2 determine the frequency at which the entire display is renewed. If the scan time is reduced, then either the transducer elements and/or low frequency Doppler shifts must be sacrificed. If the scan time is increased to accommodate more transducers, the display flicker will become worse.

It is apparent that although audio filters are employed to detect the motion of the particles, other means such as the combination of zero crossing detectors and counters can be connected to the demultiplexer 41 to provide a motion signal.

We claim:

1. A system for imaging blood vessels by detecting the flow of blood particles through the vessels including a transducer comprising an array of transducer elements, means for periodically and sequentially driving each of said transducer elements with a pulse of energy having a predetermined frequency, a Doppler receiver means sequentially connected to each of said respective transducer elements and providing a video signal indicating the flow of blood particles in the vessels, means for periodically sampling the video signal from the Doppler receiver means and for generating an output indicating reflection from a moving blood particle located at a corresponding distance away from the respective transducer element, and means for forming a display indicating the location under each element of the array where moving blood particles have been detected to thereby form a display of the depth, location and size of the underlying vessel.

2. A system for imaging blood vessels by detecting the flow of blood particles through the vessels including an H-shaped transducer including three linear arrays of transducer elements, means for periodically and sequentially driving each of said transducer elements with a pulse of energy having a predetermined frequency, a Doppler receiver means sequentially connected to each of said respective transducer elements and providing an output signal indicating the flow of blood particles in the vessels, means for periodically sampling the output signal from the Doppler receiver means corresponding to each of said transducer elements to provide an output indicating reflection from a moving blood particle located at a corresponding distance away from the respective transducer element, and means for forming a display indicating the location under each element of the array where moving blood particles have been detected to thereby form a display of the depth, location and size of the underlying vessel.

3. A system for imaging blood vessels by detecting the flow of blood particles through the vessels including a transducer comprising an array of in-line transducer elements each adapted to emit ultrasonic waves in response to bursts of electrical energy and to generate electrical signals in response to the impingement of ultrasonic waves on said transducer elements, means for periodically generating bursts of electrical energy having a predetermined frequency, Doppler receiving means adapted to provide a video signal indicating the flow of blood particles through the vessels, multiplexing means serving both to individually and sequentially connect said transducer elements to receive said bursts of electrical energy from the periodic generating means thereby emitting bursts of ultrasonic waves and also to connect the respective transducer elements to said Doppler receiving means whereby the electrical signals generated by the impingement of ultrasonic waves on the respective transducer element are applied to said Doppler receiving means, means for periodically sampling the video signals from said Doppler receiving means and for generating an output indicating reflection from a moving blood particle located at a corresponding distance from the respective transducer element, and means for forming a display indicating the location under each transducer element where moving blood particles have been detected to thereby provide a display of the depth, location and size of the underlying vessel.

4. A system as in claim 3 in which said means for sampling the video signal from the Doppler receiving means comprises a plurality of means for detecting Doppler frequency shift and multiplexing means for sequentially and individually connecting said frequency shift detecting means to said Doppler receiving means whereby each frequency shift detecting means provides an output signal to the display means when there is a flow of blood particles at the corresponding depth.

5. A system as in claim 4 in which said means for forming a display comprises a cathode ray tube in which a deflected beam provides the visual display on the face thereof, means for deflecting the beam along the x-axis across the face of the tube as the plurality of frequency shift detecting means are scanned, means responsive to the output of the frequency shift detecting means for modulating the beam intensity whereby a spot is formed on the tube face when the flow of blood particles is detected, and means for moving the beam along the y-axis to scan a new horizontal line as energy is sequentially applied to each different transducer element.

6. A system for imaging blood vessels by detecting the flow of blood particles through the vessels including an H-shaped transducer comprising three linear arrays of transducer elements each adapted to emit ultrasonic waves in response to bursts of electrical energy and to generate signals in response to the impingement of ultrasonic waves on said transducer elements, each of said arrays connected to a system including means for periodically generating bursts of electrical energy having a predetermined frequency, Doppler receiving means adapted to provide a video signal indicating the flow of blood particles through the vessels, multiplexing means serving both to individually and sequentially connect said transducer elements to receive said bursts of electrical energy from the periodic generating means thereby emitting bursts of ultrasonic waves and also to connect the respective transducer elements to said Doppler receiving means whereby the electrical signals generated by the impingement of ultrasonic waves on the respective transducer element are applied to said Doppler receiving means, means for periodically sampling the video signals from said Doppler receiving means and for generating an output indicating reflection from a moving blood particle located at a corresponding distance from the respective transducer element, and means for forming a display indicating the location under each transducer element where moving blood particles have been detected to thereby provide a display of the depth, location and size of the underlying vessel.

7. A method of imaging blood vessels by detecting the flow of blood particles through the vessels which comprises placing an array of ultrasonic transducer elements over a vessel, sequentially and periodically energizing the transducer elements in the array with pulses of electrical energy of predetermined frequency to emit pulses of ultrasonic waves, reflecting the pulses of ultrasonic waves off of the blood particles flowing through the vessel, receiving the reflected ultrasonic pulses with the array of transducer elements thereby generating electrical signals in response thereto, sequentially and periodically sampling said electrical signals generated by said transducer elements, processing said electrical signals to detect the moving blood particles under each of said transducer elements and to provide outputs corresponding to the depth of the moving particles below the array and combining said outputs in a display to indicate the region where there is flow thereby imaging the vessel.

8. A method of determining the orientation of the axis of a blood vessel, comprising the steps of:
placing an array of ultrasonic transducer elements over a vessel, said array being an H-shaped array with three linear arrays of transducer elements;
sequentially and periodically energizing the transducer elements with pulses of electrical energy of predetermined frequency to emit pulses of ultrasonic waves;
reflecting the pulses of ultrasonic waves off of the blood particles flowing through the vessel;
receiving the reflected ultrasonic pulses with the array of transducer elements thereby generating electrical signals in response thereto;
processing said electrical signals to detect the moving blood particles under each of said transducer elements and to provide outputs corresponding to the depth of the moving particles below the array;
combining said outputs in a display to indicate the region where there is flow; and
rotating the H-shaped array of transducer elements until the axis of the vessel is directly under the center of the parallel linear arrays, whereby the orientation of the vessel display with respect to the perpendicular array indicates the direction of the vessel with respect to the array.

* * * * *